United States Patent [19]

Coakley

[11] 3,723,025
[45] Mar. 27, 1973

[54] VARIABLE BYPASS FOR FLUID POWER TRANSFER SYSTEMS

[75] Inventor: James L. Coakley, Camarillo, Calif.

[73] Assignee: Abex Corporation, New York, N.Y.

[22] Filed: Oct. 23, 1970

[21] Appl. No.: 83,330

[52] U.S. Cl..................417/299, 137/115, 417/300, 417/307
[51] Int. Cl.............................................F04b 49/00
[58] Field of Search......417/282, 300, 302, 307, 299; 137/115, 116, 117; 251/205

[56] References Cited

UNITED STATES PATENTS

| | | | |
|---|---|---|---|
| 2,779,291 | 1/1957 | Albright | 417/405 X |
| 1,128,077 | 2/1915 | Taylor | 137/115 |
| 2,103,299 | 12/1937 | Ravnsbeck | 137/115 |
| 3,472,281 | 10/1969 | Chiba et al. | 251/205 X |

Primary Examiner—Carlton R. Croyle
Assistant Examiner—Richard J. Sher
Attorney—Wood, Herron & Evans

[57] ABSTRACT

Apparatus for variably dividing the output flow of a pump between a work system and a bypass system, in accordance with the flow demanded by the work system. The apparatus includes a metering valve which is progressively opened as the demand for work flow increases, to permit pump output to flow to the work system. The apparatus also includes a bypass valve which regulates flow to a bypass system, and which is progressively closed as the metering valve opens, so that total pump output is distributed as needed between the work and bypass system.

6 Claims, 3 Drawing Figures

PATENTED MAR 27 1973 3,723,025

INVENTOR.
James L. Coakley
BY
Wood, Herron & Evans
ATTORNEYS

VARIABLE BYPASS FOR FLUID POWER TRANSFER SYSTEMS

This invention relates to the transfer of power from a fluid motor to a pump driven by the motor. More specifically, the invention relates to a bypass for improving the efficiency of pumps in such power transfer apparatus by dividing the pump output flow between a work system and a bypass system, according to the demand for pressure fluid by the work system.

Fluid power transfer apparatus of both the hydraulic and the pneumatic type are used where it is desirable to take power from one fluid system and use it to provide power for a second fluid system. This is done by connecting a fluid motor in the first system to drive a fluid pump in the second system, so that the motor transfers power in the form of mechanical torque to the pump, which converts the power into fluid pressure for the second system. Such apparatus or "transfer packages" are used in aircraft, naval vessels, and other installations having dual fluid pressure systems to provide redundancy such that if the pump in one system fails the second system can be used to drive the pump of the first. Each individual system may be either hydraulic or pneumatic, and this invention is applicable to systems wherein the fluid upon which the pump operates is hydraulic or pneumatic, but is primarily disclosed hereinafter in relation to hydraulic pumps.

At medium and high speed ranges of operation the motor in the first system drives the pump efficiently in the second system; that is, power is transferred from system to system with relatively low loss through internal pump friction. However, at low pump and motor speeds, for example about 100 rpm, the internal pump friction increases, and torque efficiency is poor. When the demand is low for pressure fluid in the work system served by the pump, the pump tends to stall the motor, and the speed is often erratic.

It is known that bypassing part of the pump output flow to a return line or reservoir without flowing to the work system can permit more efficient speeds of operation where the system itself does not demand high flow.

To reduce erratic running, a check valve has in the past been connected at the outlet of the pump between the pump and the load operated by the pump, with a bleed line to the low pressure side of the pump, on the pump side of the check valve. This permits the pressure seen by the pump to drop to whatever level is required for start up, without bleeding down the pressure in the system served by the pump. The check valve will close and the bleed line will reduce the pressure seen by the pump.

Internal leakage of the pump may be large enough to give the required output pressure without any additional bypass flow, if large output pressure variations are acceptable at low demand. These large variations result from very substantial pump efficiency changes with speed at low speeds.

In other instances, however, where output pressure must remain nearly constant over the entire low demand range, it is sometimes necessary to introduce a bypass flow. If this additional bypass flow is constant, it increases the power drain from the fluid motor over the entire operating range, because fluid is merely circulated internally through the pump and performs no useful work in the system served by the pump. Thus, past devices have provided bypass flow both when it is needed, and when it is not; and other pumps have not provided bypass at all, or have provided insufficient bypass.

It is a major purpose of this invention to provide variable bypass flow means such that when there is no demand for flow to the system served by the pump, a bypass flow is established which is sufficient to maintain efficient power transfer, and such that the bypass flow is reduced as the demand for work flow increases. The pump output is divided between the load system and the bypass system. The bypass flow may, if desired, decrease at essentially the same rate as the demand flow to the system increases. This results in an essentially constant flow from the pump through the flow operating interval from no demand flow, to demand flow equal to the maximum bypass flow.

This is accomplished in accordance with the invention by a valve which establishes a controlled pressure drop and which incorporates a bypass feature. More particularly, a valve is connected between the pump outlet and the load system, and responds to the pressure differential across it. This pressure differential is related to the demand for flow to the load system, and increases as the demand for flow to the load or work system increases. The differential also operates a bypass valve that regulates a bypass flow from the outlet side of the pump to a bypass system or reservoir. As the pressure differential between the pump outlet line and the load system increases, indicating a higher demand flow, the valve automatically reduces or stops the bypass flow; the rate of closure may be lineal and in proportion to the rate of increase of the demand flow. Thus bypass flow diminishes as demand or load flow increases, and vice versa.

The various features and advantages of the invention will be more clearly apparent from the following description, taken in conjunction with the drawings in which.

Figure 1:
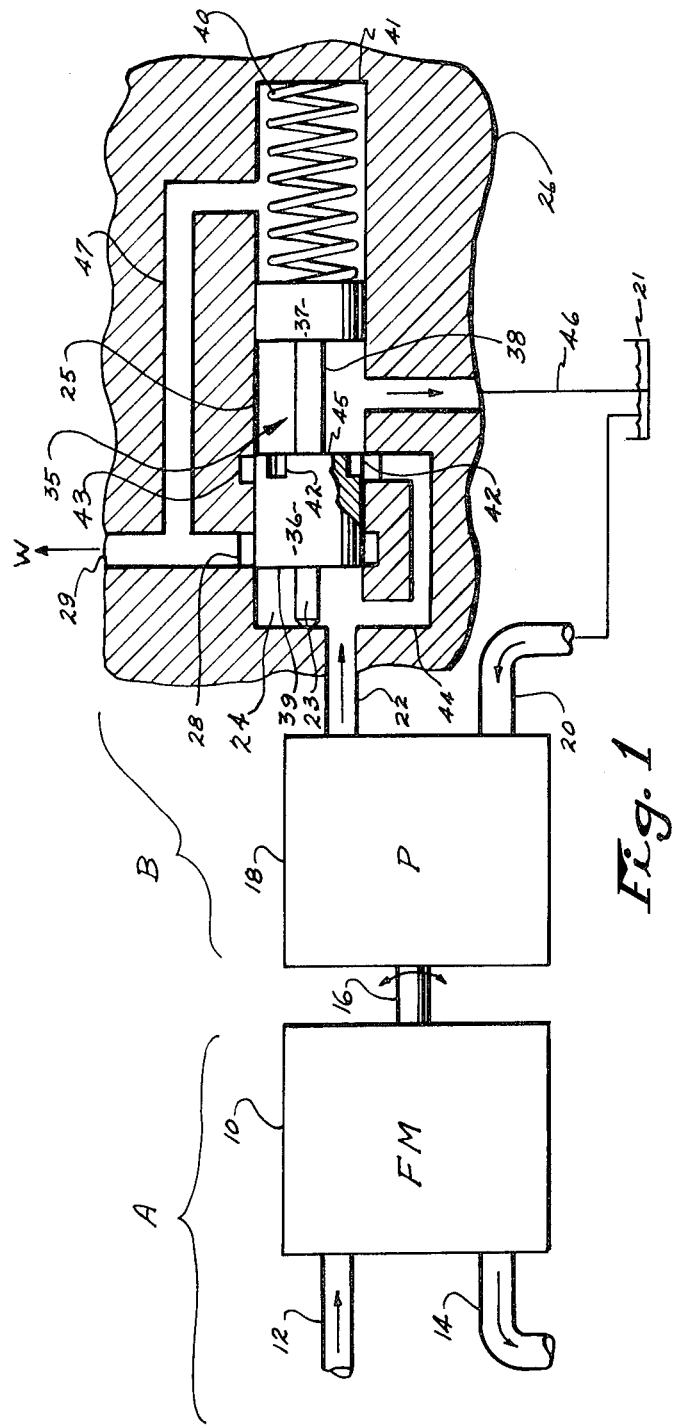
FIG. 1 is a schematic diagram of portions of two fluid systems in a fluid power transfer apparatus, and includes a longitudinal section of bypass means in accordance with a preferred form of the invention, showing the metering valve closed and the bypass valve fully open.

In the fluid power transfer apparatus shown for purposes of illustration, a first fluid system A includes a fluid motor 10 which is rotated by the flow through it of pressure fluid from line 12 to line 14. Motor 10 turns a shaft 16, which delivers power in the form of mechanical torque to a pump 18 which is connected in a second fluid system B.

Pump 18 has an inlet or suction line 20 which receives hydraulic fluid from a supply tank or reservoir indicated at 21. The pump delivers pressure fluid to outlet or pressure line 22. Line 22 leads to a valve or delivery chamber 24 in a closed cylindrical bore 25 in a valve body or casing 26. The pump output flow is delivered into chamber 24. The valve body 26 in which bore 25 is formed may be a part of the pump casing or it may be separate.

Pressure line 22 enters the valve chamber 24 in bore 25 at one end thereof. A metering or work port 28 is formed in the side of bore 25. Port 28 may be a peripheral groove extending entirely around bore 25, as shown, or it may be rectangular in shape where it opens to the bore. Port 28 is connected to a passage or conduit 29 which in use is connected to a work load W in a work system.

Figure 2:
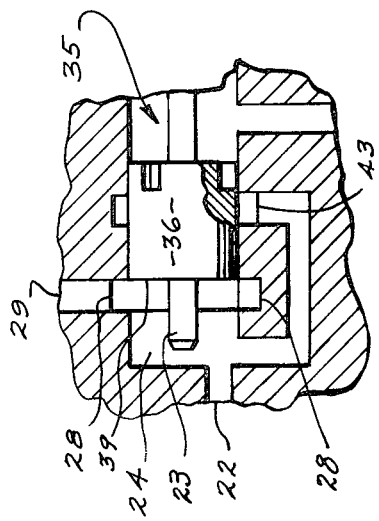
FIG. 2 is a partial section of the construction shown in FIG. 1, showing the metering valve in full open position and the bypass valve in fully closed position.

A movable valve element designated generally by 35 is slidable axially in bore 25. The valve element 35 includes two spaced generally cylindrical lands 36 and 37 which are separated by a groove 38. A stop 23 on land 36 limits movement of valve element 35 to the point at which port 28 is just closed by the edge of face 39 of land 36 which is exposed to pressure in chamber 24. Spring biasing means 40 bias valve element 35 to the position shown in FIG. 1 in which metering port 28 is just closed by "line-on-line" contact of land 36. Pressure in chamber 24 opposes the force of spring 40. Thus land 36 and port 28 cooperate to form a metering valve which controls the passage of pump output to the work system. This valve is progressively opened by rightward movement of valve element 35 from the position shown in FIG. 1. FIG. 2 shows the metering valve in full open position.

A branch line 47 connects passage 29 with that portion of bore 25 which is behind spool land 37 (or to the right of it in FIG. 1), and equalizes the pressure in the bore chamber 41 (in which spring 40 resides) with that in passage 29. Pressure in chamber 41 acts with spring 40 to urge the movable valve element 35 to the position shown in FIG. 1 in which metering port 28 is closed.

In addition to cooperating in forming the metering valve, land 36 also includes structure which forms a bypass valve in bore 25. A bypass port in the form of a circumferential groove 43 extends around bore 25 at such position that the right face 45 of land 36 covers the groove 43 when the left face 39 of the land closes port 28 (face 45 may overlap groove 43, but this is not necessary). A passage 44 supplies pressure fluid from the pump outlet line 22 to groove 43. On or more bypass orifices 42 are formed in the edge of land face 45. These are shown in FIG. 1 as square sectioned notches. Three such notches may be formed at angularly spaced locations around the periphery of face 45 to provide adequate bypass flow area (see FIG. 1). A return line 46 leads to tank 21 from the portion of bore 25 which is between lands 36 and 37 on spool 35. It will be seen that the orifices 42 in land 36 and groove 43 define a bypass valve which controls the flow of pump output fluid to the bypass system comprising groove 38, line 46 and tank 21.

When the left land face 39 just closes metering port 28, the bypass orifices 42 are in maximum communication with groove 43. Rightward movement of valve member 35 from the position shown in FIG. 1 progressively closes the bypass valve. The bypass valve is shown in closed position in FIG. 2.

By this apparatus, the pump and motor are permitted to operate in an efficient operating range so that the pump output pressure is nearly constant.

Depending upon valve size and configuration, flow through the metering valve may then be proportional to the axial displacement of the valve member 35. This will be the case if, as is preferred, metering port 28 is formed by a full peripheral port as shown, or by a rectangular port, and if the preload on spring 40 is made sufficiently high and the spring rate sufficiently low that the pressure drop across the metering valve orifice is essentially constant over the flow range. Similarly, where the bypass orifices 42 are formed as rectangular notches, the flow through them will decrease lineally with rightward displacement of spool 35, since the pressure drop across the rectangular orifices is determined by the pump output pressure which is essentially constant. From this disclosure, those skilled in the art will understand that the change in flow to the work system through the metering valve can thus be equal but opposite to the change in bypass flow through the bypass valve, over the range of flows through the orifices 42.

Figure 3:
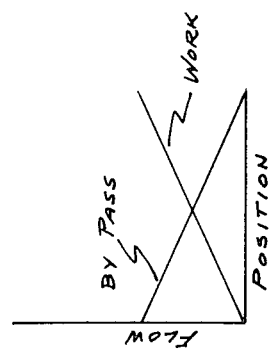
FIG. 3 is a graphical representation of the variation of the fluid flows through the metering and bypass ports, as functions of the position of the movable valve element.

When the work system or work load W requires or will accept no flow from pump 18, the pressure in line 29 is substantially equal to the pump outlet pressure in pressure line 22. The pressure in the work system is reflected or transmitted through branch line 47 into spring chamber 41, where it acts with spring 40 to exert a metering valve closing (i.e., leftward) force on spool 35. This results in the metering valve being closed by land 36; and simultaneously the metering orifice 42 is opened to its maximum extent. Pump output fluid then flows from the pump output line 22 through bypass line 44, groove 43, orifices 42, into spool groove 38, and is returned to tank 21 through line 46. When the work load W calls for fluid, the pressure in line 29 drops relative to the pressure in line 22, and this decrease is reflected through line 47 into chamber 41. In response, spool 35 is moved rightward by the differential between the forces exerted in chamber 24 and 41. The flow called for by the load passes through the metering valve and at the same time the bypass orifices 42 are partially or fully closed reducing the bypass flow. (FIG. 3 shows the flow-displacement relations where the increase in demand flow through port 28 equals the decrease in bypass flow.) Rightward movement of spool 35 stops when the flow through the metering orifice is such that the leftward acting pressure and spring forces in chamber 41 equal the rightward acting pressure force in chamber 24.

It will be seen that the bypass means is variable; it is not a snap action, open or closed valve, but adjusts incrementally or progressively to provide a bypass flow which is inversely related to the demand flow to work. A more efficiently designed pump 18 can be used because there is no need for internal pump leakage to provide bypass. Torque efficiency is increased because low speed stalling at low demand flow to the work system is avoided. Furthermore, there is no constant power drain since the bypass flow is reduced as the flow to the work system increases.

Having described my invention, I claim:

1. Fluid power transfer apparatus for transferring power from a first fluid system to a second fluid system, comprising, a fluid motor in said fluid system;

a pump in said second fluid system, said motor connected to drive said pump; and variable bypass means for the output flow of said pump;

said bypass means comprising, a work port through which said output flow must pass to flow to said second system, a metering valve progressively movable with respect to said work port to control the passage of said output flow through said work port, a bypass port for connection to a bypass system, passage means connecting said bypass port with the pump outlet line, a bypass valve progressively movable with respect to said bypass port to control the passage of said output flow through said bypass port to said bypass system, said bypass valve including a rectangular sectioned orifice in a piston movable across said bypass port, and valve actuating means responsive to the demand for flow to said second system to open said metering valve progressively as said demand increases, and simultaneously to close said bypass valve progressively.

2. The fluid power transfer apparatus of claim 1 wherein said valve actuating means is responsive to a differential in pressures between the pump outlet line and the second system.

3. The fluid power transfer apparatus of claim 2 wherein said valve actuating means comprises, a piston subjected on one side thereof to the pressure of fluid in said pump outlet line and on an opposite side thereof to pressure of fluid in said second system, and means biasing said piston in a direction closing said work port.

4. The fluid power transfer apparatus of claim 3 wherein said piston forms a part of both said metering valve and said bypass valve, such that movement of said piston operates both said metering valve and said bypass valve.

5. The fluid power transfer apparatus of claim 1 wherein said bypass port is a peripheral internal groove around a bore, and said orifice provides a path of maximum area for flow to said bypass system when metering valve is closed.

6. Fluid power transfer apparatus for transferring power from a first fluid system to a second fluid system, comprising, a fluid motor in said first fluid system;

a pump in said second fluid system, said motor connected to drive said pump; and variable bypass means for the output flow of said pump;

said bypass means comprising, a work port through which said output flow must pass to flow to said second system, a metering valve progressively movable with respect to said work port to control the passage of said output flow through said work port, a bypass port for connection to a bypass system, passage means connecting said bypass port with the pump outlet line, a bypass valve progressively movable with respect to said bypass port to control the passage of said output flow through said bypass port to said bypass system, and valve actuating means responsive to the demand for flow to said second system to open said metering valve progressively as said demand increases, and simultaneously to close said bypass valve progressively, said work port being a peripheral internal groove around a bore and said metering valve including a piston movable across said groove to control flow therethrough.

* * * * *